United States Patent
Vohra et al.

(10) Patent No.: US 6,907,158 B2
(45) Date of Patent: Jun. 14, 2005

(54) CONFIGURABLE OPTICAL ADD/DROP MULTIPLEXER WITH PARTIAL OR COMPLETE WAVELENGTH DROP CAPABILITY

(75) Inventors: Sandeep J. Vohra, Ellicott City, MD (US); Paul J. Matthews, Ellicott City, MD (US)

(73) Assignee: Broadband Royalty Corporation, Wilmington, DE (US)

( * ) Notice: Subject to any disclaimer, the term of this patent is extended or adjusted under 35 U.S.C. 154(b) by 233 days.

(21) Appl. No.: 10/286,975

(22) Filed: Nov. 4, 2002

(65) Prior Publication Data

US 2003/0091274 A1 May 15, 2003

Related U.S. Application Data

(60) Provisional application No. 60/330,948, filed on Nov. 5, 2001.

(51) Int. Cl.[7] ................................................. G02B 6/28
(52) U.S. Cl. .......................................... 385/24; 385/16
(58) Field of Search ........................... 385/16, 24, 115; 398/58–64

(56) References Cited

U.S. PATENT DOCUMENTS

| | | | | |
|---|---|---|---|---|
| 5,467,212 A | | 11/1995 | Huber | |
| 5,726,788 A | | 3/1998 | Fee et al. | |
| 6,134,036 A | * | 10/2000 | Andreozzi et al. | 398/1 |
| 6,223,074 B1 | * | 4/2001 | Granger | 600/544 |
| 6,728,485 B2 | * | 4/2004 | Pfeiffer | 398/74 |
| 2004/0042711 A1 | * | 3/2004 | Bock et al. | 385/24 |

* cited by examiner

Primary Examiner—Juliana Kang
(74) Attorney, Agent, or Firm—Oblon, Spivak, McClelland, Maier & Neustadt, P.C.

(57) ABSTRACT

An arrangement is provided for a configurable optical add/drop multiplexer (OADM) mechanism. The configurable OADM mechanism comprises at least one configurable optical add/drop multiplexer (C-OADM) module and at least one switch associated with the C-OADM modules (the minimum configuration is only one C-OADM with bypass (expansion) switches). The switches can be configured so that some of the C-OADM modules can be selected to form a processing pipeline. Each of the selected C-OADM modules may be further configured to perform wavelength manipulations such as adding a wavelength, dropping a wavelength, tapping an input optical signal, and a combination thereof.

32 Claims, 12 Drawing Sheets

CONFIGURABLE OPTICAL ADD/DROP MULTIPLEXER WITH PARTIAL OR COMPLETE WAVELENGTH DROP CAPABILITY

This Application is based on Provisional Application No. 60/330,948 filed Nov. 5, 2001, the entire contents of which is hereby incorporated by reference.

BACKGROUND

1. Field of Invention

The present invention relates to a device and method for use in wavelength division multiplexed communications systems and systems incorporating the device. More specifically, the present invention relates to a device and method for extracting and adding information from and to wavelength division multiplexed systems, and systems incorporating the device.

2. Discussion of Related Art

Demand for optical communication systems is growing with the growing demand for faster and more reliable broadband networks. Wavelength division multiplexing (WDM) is one technique used to increase the capacity of optical communication systems. Such optical communication systems include, but are not limited to, telecommunication systems, cable television systems (CATV), and local area networks (LANs). An introduction to the field of Optical Communications can be found in "Optical Communication Systems" by Gowar, ed. Prentice Hall, NY, 1993.

WDM optical communication systems carry multiple optical signal channels, each channel being assigned a different wavelength. Optical signal channels are generated, multiplexed to form an optical signal comprised of the individual optical signal channels, and transmitted over a single waveguide such as an optical fiber. The optical signal is subsequently demultiplexed such that each individual channel is routed to a designated receiver.

Single or multiple optical channels can be routed to different destinations, such as in telecommunication networks, cable television subscriber systems and optical LANs. Routing is performed by selectively sending specific channels to a desired location. Another signal may be subsequently added to the dropped or other unused channel. This form of optical routing is generally referred to as "optical add/drop multiplexing" which is performed by an "optical add/drop multiplexer" or OADM.

Current OADMs allow a wavelength channel to be completely dropped from an optical signal. A "pay-as-you-grow" type of service paradigm is now in demand. In a metropolitan optical network utilized by telecom as well as cable systems, a higher degree of flexibility is often needed where a partial amount of a wavelength channel is required to be dropped while the remainder continues along the transmission line. Such an architecture enables wavelength sharing or wavelength broadcasting.

A higher degree of flexibility may become necessary in different situations. For instance, when traffic patterns change, drop capacity requirements may gradually increase until a complete wavelength drop may be needed at a particular location. In addition, when a service provider responds to increased demand and gradually upgrades allowed bandwidth, a smooth "in service" upgrade along a distribution path may require more wavelength channels to be dropped during the upgrading period.

SUMMARY

In accordance with the present invention, a configurable optical add/drop multiplexer (C-OADM) is provided for flexible wavelength channel adding, dropping, tapping, and any combination thereof. The configurable OADM mechanism includes one or more configurable optical add/drop multiplexer (C-OADM) modules, each of which may be designated to perform certain wavelength manipulations.

In an embodiment, the configurable OADM mechanism is configurable in terms of which C-OADM modules are to be used to form a processing pipeline. In this embodiment, each C-OADM module is associated with a pair of switches connected to the input and output ports of the C-OADM module. One can select one or more C-OADM modules to form a processing pipeline by using the switches associated with the C-OADM modules.

In accordance with another aspect of the invention, each C-OADM module may comprise a plurality of pathways, each of which may carry out a specific wavelength operation such as adding, dropping a wavelength channel, or tapping an optical signal. Different pathways may overlap and may be set in operation at the same time. Some of the pathways may include one or more wavelength selection devices used to recognize the wavelength channels to be manipulated. A plurality of switches are provided in each C-OADM module so that different pathways may be set in operation either individually or in combination to perform desired wavelength manipulation.

In another embodiment with respect to C-OADM modules, each pathway in a C-OADM module may be designed to perform a predetermined wavelength manipulation such as adding a specific wavelength, dropping a specific wavelength, or tapping an optical signal. More than one pathway may be designed to operate at the same time to carry out an operation corresponding to a combination of the adding, dropping, and tapping. Wavelength selection devices in different pathways may be realized using thin film filters, fiber Bragg grating filters, Fabry-Perot and Arrayed Waveguide Grating Router based filters, Bulk diffraction gratings, Mach-Zenhder interferometers, ring resonators, sliding wedge filters, or any other wavelength-selective device.

In another embodiment, each C-OADM module that is configured to be included in the processing pipeline may be further configured dynamically to perform desired wavelength manipulations. Operational parameters related to each pathway such as the wavelength to be selected may be configured according to particular needs. Wavelength selection devices may be realized using tunable devices such as tunable fiber Bragg grating filters for which fiber gratings may be dynamically controlled to select a desired wavelength according to particular needs. Different pathways may also be dynamically configured to work together to achieve a desired combination of wavelength manipulations such as dropping a first wavelength from and adding a second wavelength to a received optical signal.

In yet another embodiment, configuration may be performed at the level of the configurable OADM mechanism itself in which C-OADM modules to be used to form a processing pipeline may be re-configured when the need changes. Furthermore, the configurations at the level of the C-OADM modules with regard to specific wavelength manipulations to be performed may also be re-configured whenever needed. The re-configuration may be applied at either one of the two different levels or at both levels.

BRIEF DESCRIPTION OF THE DRAWINGS

The invention claimed and/or described herein is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

The present invention involves a configurable optical add/drop multiplexer (OADM) that provides the flexibility of performing various configurable operations on wavelength channels carried in an optical communication systems. The mechanism comprises one or more configurable optical add/drop multiplexer (C-OADM) modules, each of which may perform certain operations on the wavelength channels contained in an optical signal.

The configurable OADM mechanism may be configurable at two different levels. First, the mechanism may be configurable in terms of which C-OADM modules are to be used to form a processing pipeline. Second, each individual C-OADM module that is configured at the first level to be included in the processing pipeline may be further configured in terms of what specific operation(s) it carries out.

The configurable OADM mechanism may also be re-configured when an application needs to be changed. Re-configuration may involve one level re-configuration which may be either the first level re-configuration or the second level re-configuration. Re-configuration may also simultaneously involve both levels.

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software or firmware being run by a general-purpose or network processor. Data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, computer-readable media may comprise any form of data storage mechanism, including such existing memory technologies as well as hardware or circuit representations of such structures and of such data.

Figure 1:
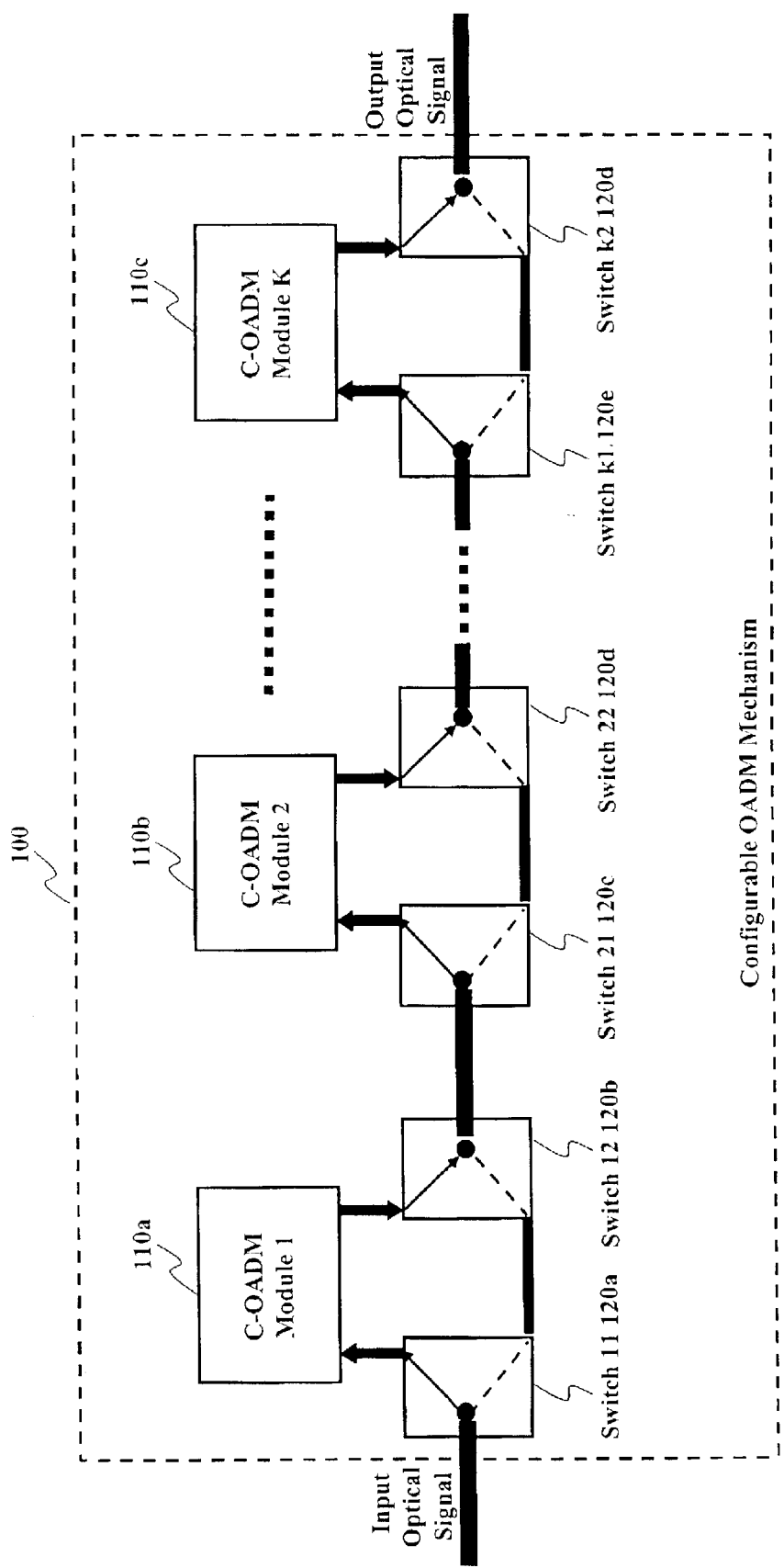
FIG. 1 depicts an exemplary architecture of an optical wavelength add/drop multiplexer mechanism, according to embodiments of the present invention.

FIG. 1 depicts an exemplary architecture of a configurable optical add/drop multiplexer (OADM) mechanism 100, according to embodiments of the present invention. The configurable OADM mechanism 100 comprises one or more configurable optical add/drop multiplexer (C-OADM) modules (C-OADM module 1 100a, C-OADM module 2 100b, . . . , C-OADM module K 100c) and a plurality of connecting switches (switch 11 120a, switch 12 120b, switch 21 120c, switch 22 120d, . . . , switch k1 120e, and switch k2 120f).

The configurable OADM mechanism 100 takes an optical signal as input and produces an optical signal as its output. Depending on the configuration of the switches and the C-OADM modules, the output optical signal may differ from the input optical signal. Some of the wavelength channels in the input optical signal may be dropped. Some of the wavelength channels in the output optical signal may be added. Some of the wavelength channels may have different power level after traveling through the configurable OADM mechanism 100. The exact difference between the input optical signal and the output optical signal may depend on how the configurable OADM mechanism 100 is configured, which includes the configuration of the switches as well as the configuration of each of the C-OADM modules.

Each C-OADM module is connected to two switches. For example, the C-OADM module 1 110a is connected to the switch 11 120a and the switch 12 120b, the C-OADM module 2 110b is connected to the switch 21 120c and the switch 22 120d, . . . , and the C-OADM module K 110c is connected to switch k1 120e and the switch k2 120f. Each pair of switches (e.g., the switch 11 120a and the switch 12 120b) is used to control whether their associated C-OADM module (e.g., the C-OADM module 1 110a) is to perform certain wavelength operation on the passing optical signal. Each block formed by an C-OADM module (e.g., the C-OADM module 110a) and its associated switches (e.g., the switch 11 120a and the switch 12 120b) corresponds to an expansion block. Different wavelength operations may be performed by different expansion blocks.

Each expansion block may be configured according to processing needs. Such configuration may be performed at two different levels. One level is the configuration of the two switches connected to the underlying C-OADM module. The switches may be configured so that no wavelength operation is to be performed on the passing optical signal. In this case, the optical signal simply bypasses the underlying C-OADM module. For example, the switch 11 120*a* and the switch 12 120*b* may be configured both to its down position so that the input optical signal simply travels through the two switches and arrives at the switch 21 120*c* of the next block.

A block may also be configured so that certain wavelength operation(s) can be performed on the passing optical signal. For example, when both the switch 11 120*a* and the switch 12 120*b* are configured at their upper positions, the switch 11 120*a* directs the input optical signal to the C-OADM module 1 110*a* so that the C-OADM module 1 110*a* can carry out certain wavelength operation(s) on the passing optical signal. When the C-OADM module 1 120*a* produces its output, the switch 12 120*b* forwards the output to the next block, or namely the switch 21 120*c*.

At this configuration level, different blocks may be individually configured and they are not required to have the same configuration. For example, the configurable OADM mechanism 100 may be configured so that an input optical signal bypasses the first block but not the other blocks. In addition, the configuration may change with time. The determination of a specific configuration at a particular time may be made according to application needs. When the application needs change, the configuration may be adapted to meet the new needs.

Another level of configuration relates to what wavelength operation(s) each of the C-OADM modules may be designated to perform. In the preferred embodiments of the present invention, each of the C-OADM modules is capable of performing operations such as adding a wavelength channel, dropping a wavelength channel, tapping an optical signal, and any combination thereof.

Figure 2:
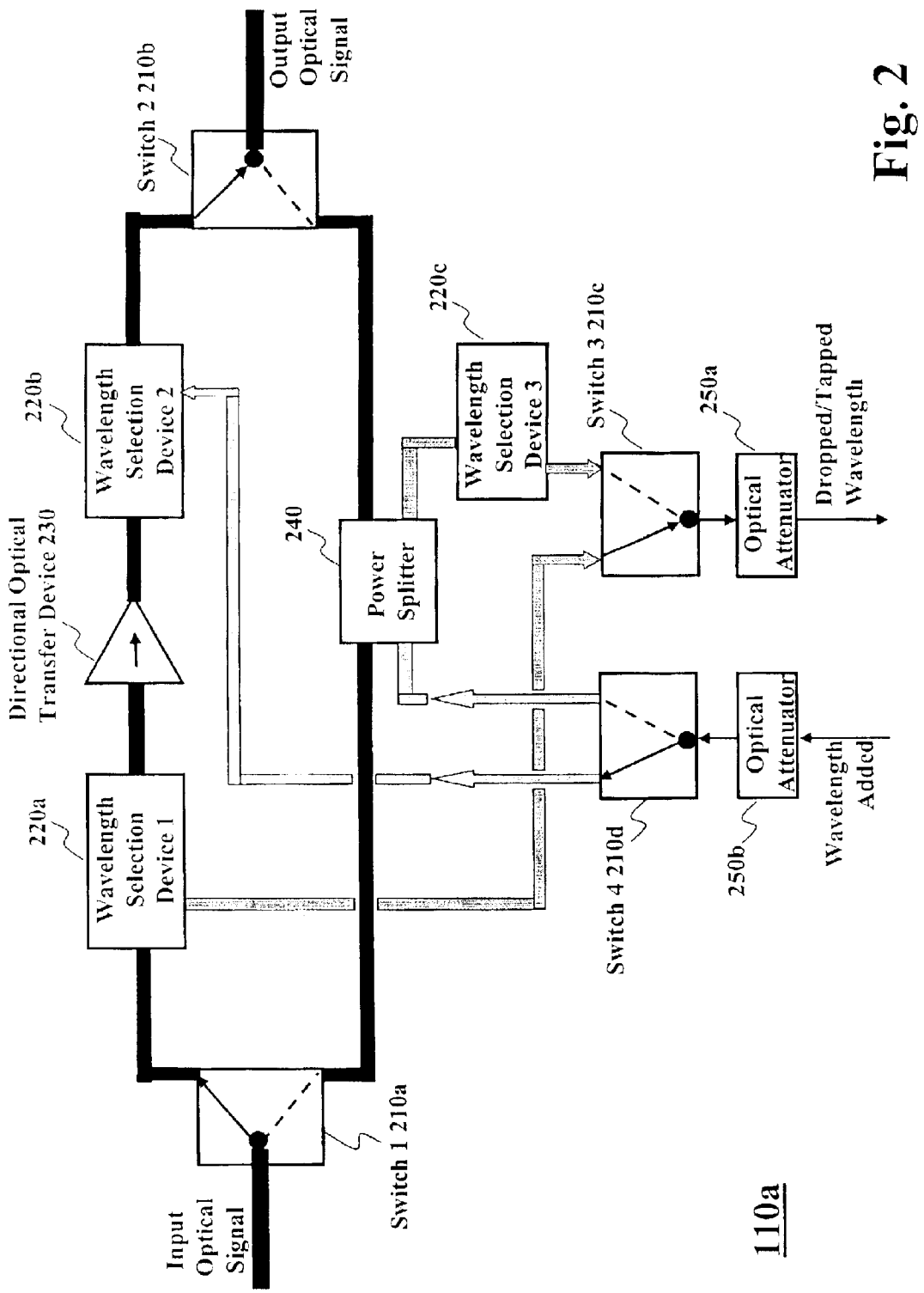
FIG. 2 depicts the schematics of an optical add/drop multiplexer module, according to embodiments of the present invention.

FIG. 2 depicts an exemplary schematic of an C-OADM module, according to embodiments of the present invention. An C-OADM module (representatively, 110*a*) comprises a plurality of 1×2 switches (switch 1 210*a*, switch 2 210*b*, switch 3 210*c*, and switch 4 210*d*), a plurality of wavelength selection devices (wavelength selection device 1 220*a*, wavelength selection device 2 220*b*, and wavelength selection device 3 220*c*), a directional optical transfer device 230, a power splitter 240, and, optionally, two optical attenuators 250*a* and 250*b*.

The schematic depicted in FIG. 2 embeds different processing pathways along which different wavelength operations may be carried out. For example, a wavelength drop operation may be carried out along the pathway of the switch 1 210*a*, the wavelength selection device 1 220*a*, the isolator 230, the wavelength selection device 2 220*b*, and the switch 2 210*b* (how this pathway achieves the wavelength drop is discussed below). At a particular time, one or more pathways may be in operation. Different pathways may be made operational through properly configuring the switches 210*a*, 210*b*, 210*c*, and 210*d*. The following discussion describes various different pathways with respect to wavelength operations that can be performed within the C-OADM module 110.

A wavelength channel contained in an input optical signal forwarded to the C-OADM module 110 may be dropped in two scenarios. In one scenario, the wavelength channel(s) in the input optical signal is not tapped. That is, all the wavelength chapels contained in the input optical signal except the one to be dropped pass through the C-OADM module 100 without changing their power level except due to component losses. This is achieved via a pathway formed by the wavelength selection device 1 220*a*, the directional optical transfer device 230, the wavelength selection device 2 220*b*, and the switch 2 210*b*. Along this pathway, a pre-determined wavelength channel is dropped and remaining wavelength channels travel through to reach the switch 2 210*b*.

To enable this wavelength channel drop pathway, both the switch 1 210*a* and the switch 2 210*b* are configured to point to the upper position so that the input optical signal travels towards the wavelength selection device 1 220*a* and the remaining wavelength channels can travel to the next block via the switch 2 210*b*. To enable the pathway to drop the predetermined wavelength channel, the wavelength selection device 1 220*a* is configured or tuned to the predetermined wavelength so that when the input optical signal arrives, the pre-determined wavelength can be singled out and separated from other remaining wavelength channels.

The separated wavelength is then directed by the wavelength selection device 1 220*a* to the switch 3 210*c*. To enable dropping of the wavelength channel, the switch 3 210*c* is simultaneously configured so that the separated wavelength can reach the optional optical attenuator 250*a* via the switch 3 210*c*. Depending on applications, the optical attenuator 250*a* may be optionally provided in situations where the wavelength channel to be dropped has been amplified along an optic fiber (e.g., by an optical amplifier) before reaching the C-OADM module 110 to prevent excess optical power at the drop receive site. The wavelength channel reaching the optical attenuator 250*a* may then be attenuated before it is dropped.

The remaining wavelength channels continue to travel from the wavelength selection device 1 220*a* through the directional optical transfer device 230 and the wavelength selection device 2 220*b* before they reach the switch 2 210*b*. Neither the directional optical transfer device 230 nor the wavelength selection device 2 220*b* interferes with the remaining wavelength channels. The directional optical transfer device 230 is a one-directional optical signal forwarding device and it is designed to let optical signals travel in one designated direction (e.g., from left to right), for example, an optical isolator.

The wavelength selection device 2 220*b* is positioned in this pathway for wavelength channel add purposes, which will be discussed below. The wavelength selection device 2 220*b* may be tuned or configured to some particular wavelength channel to be added. When none of the remaining wavelength channels matches with this wavelength configured to be added, the wavelength selection device 2 220*b* simply serves as a conduit for the remaining wavelength channels to travel through to reach the switch 2 210*b*. At the exit, the optical signal with remaining wavelength(s) may exit the current block through a switch connected to the switch 2 210*b* (e.g., the switch 12 120*b* (see FIG. 1).

In a different scenario, a wavelength channel may be partially dropped after the input optical signal is tapped. That is, all the wavelength channels contained in the input optical signal are tapped and one of the tapped wavelength channels may then be dropped. This is achieved through a pathway formed by the power splitter 240, the wavelength selection device 3 220*c*, the switch 3 210*c*, and, optionally, the optical attenuator 250*a*. The switch 1 210*a* and the switch 2 210*b* are configured to their corresponding low positions so that the optical signal can be directed to, processed, and forwarded on along the pathway.

When information contained in the input optical signal is to be accessed, the input optical signal may be tapped. To tap the input optical signal, the power of the input optical signal may be split. This is achieved through the power splitter 240. Each wavelength may be split into two portions with each portion having a certain percentage of the original power. One portion may represent the portion to be stripped and the other may represent the portion to be forwarded on through the switch 2 210*b*.

The power splitter 240 may be configured to achieve the power split according to some desired percentages. For example, the power splitter 240 may be configured to split each incoming wavelength in the optical signal according to a 10 percent versus 90 percent power split. The portion of each wavelength corresponding to 90 percent of the original power may be forwarded on to the switch 2 210*b*. The portion corresponding to the 10 percent power strength may be directed to the wavelength selection device 3 220*c*.

To drop a wavelength with partial power, the wavelength selection device 3 220*c* may be configured to select the wavelength to be dropped from the tapped wavelength channels (of certain power strength). For example, the input optical signal may carry 10 wavelength channels and only one of them with a particular wavelength may be selected by the wavelength selection device 3 220*c*. The selected wavelength channel is then directed to the optical attenuator (optional) through the switch 3 210*c* which is configured to receive the wavelength channel from the wavelength selection device 3 220*c*. Compared with the complete wavelength drop operation achieved by the first pathway described above, the wavelength drop operation achieved by this pathway does not drop a wavelength channel completely because only a portion of the wavelength channel strength (e.g., with 10 percent power) is dropped. This allows the information contained in this wavelength to simultaneously continue to the output of the C-OADM.

A channel of information may be added to the transmission optical signal on an unused wavelength channel. Similar to the previously described two wavelength channel drop modes, a wavelength channel may be added in two different scenarios. A wavelength channel may be added to the input optical signal when the optical signal is not tapped. This is achieved through a pathway formed by the optical attenuator 250*b*, the switch 4 210*d*, the wavelength selection device 2 220*b*, the directional optical transfer device 230, and the switch 2 210*b*. A wavelength channel may also be added to a transmission optical signal that is simultaneously to be tapped. This is achieved through a pathway along the optical attenuator 250*b*, the switch 4 210*d*, the power splitter 240, and the switch 2 210*b*.

When a wavelength channel is to be added to an un-tapped optical signal, the switch 1 210*a*, the switch 2 210*b*, and the switch 4 210*d* are configured as follows. The switch 1 210*a* is configured to direct the input optical signal to the wavelength selection device 1 220*a*. The switch 4 210*d* is configured to direct the wavelength channel to be added to the wavelength selection device 2 220*b*. The switch 2 210*b* is configured to forward the signal emerged from the wavelength selection device 2 220*b*.

When the input optical signal reaches the switch 1 210*a*, it travels through the wavelength selection device 1 210*a*, the directional optical transfer device 230, the wavelength selection device 2 220*b*, and the switch 2 210*b*. The wavelength channel to be added enters the optional optical attenuator 250*b* and travels through the switch 4 210*d* to reach the wavelength selection device 2 220*b*. The wavelength selection device 2 220*b* is configured to select the wavelength channel to be added. Such selected wavelength channel is reflected and merges with the wavelength channels in the input optical signal. Together, the original wavelength channels and the wavelength added travel to the switch 2 210*b*.

The directional optical transfer device 230 may be designed to prevent the wavelength channel to be added to travel towards the wavelength selection device 1 220*a*. This may help to prevent potential cross talk introduced when the signal is allowed to travel in an opposite direction. Using the directional optical transfer device 230, such potential cross talk or the interference between the signal encoded in the wavelength channel added and the signal encoded in the original wavelength channels of the optical signal is minimized.

When a wavelength channel is added to a tapped optical signal, the switch 1 210*a*, the switch 2 210*b*, and the switch 4 210*d* are configured as follows. Both the switch 1 210*a* is configured to direct the input optical signal to the power splitter 240. The switch 4 210*d* is configured to direct the added wavelength channel to be added also to the power splitter 240. The switch 2 210*b* is configured to forward the signal from the power splitter 240.

The power splitter 240 splits the power of all the incoming wavelength channels, including both the original wavelength channels in the input optical signal and the added wavelength channel, into two portions, each with certain percentage of powers according to its configuration. One portion of all the wavelength channels are then directed to the switch 2 210*b* as the output optical signal of the C-OADM module 110. The other portion is directed to the wavelength selection device 3 220*c*. Some of the wavelength channels may be selected by the wavelength selection device 3 220*c* if it is configured to do so. In this case, such wavelength channel(s) may be simultaneously dropped.

Different pathways may be in operation at the same time to perform a combination of the wavelength operations described above. Wavelength channels may be dropped and added at the same time. For example, the wavelength selection device 1 220*a* may be configured to drop wavelength channel $\lambda_1$ and the wavelength selection device 2 220*b* may be configured to select a different wavelength channel $\lambda_2$. When relevant switches are configured appropriately, wavelength channel $\lambda_1$ may be dropped at the wavelength selection device 1 220*a* and the wavelength channel $\lambda_2$ may be added to the remaining wavelength channels by the wavelength selection device 2 220*b*. In this case, the output optical signal may contain the same number of wavelength channels but with different composition.

Adding a wavelength to a tapped optical signal may also be performed at the same time when a tapped wavelength is to be dropped. In this case, the third pathway and the fourth pathway described above are in operation at the same time. The switch 1 210*a* is configured to direct input optical signal to the power splitter 240 and the switch 2 210*b* is configured to receive optical signals from the power splitter 240. At the same time, the switch 3 210*c* is configured to receive a dropped wavelength channel from the wavelength selection device 3 220*c* and the switch 4 210*d* is configured to direct the added wavelength channel to the power splitter 240.

The power splitter 240 splits the power of all wavelength channels, including the ones in the input optical signal and the added wavelength channel. One portion is directed to the wavelength selection device 3 220*c*, which selects the wavelength channel(s) to be dropped and directs it to the optical attenuator 250*a* via the switch 3 210*c*.

The C-OADM module 110 is capable of being configured to function in different operational modes, including a drop mode, an add mode, a tapping mode, an add/drop mode, a drop/tapping mode, an add/tapping mode, and an add/drop multiplexer mode. Different blocks in the configurable OADM mechanism 100 are therefore capable of being configured to operate in different modes so that the input optical signal may be manipulated at each block in different ways. For instance, the first block may be configured to drop a particular wavelength channel and add a signal on an un-used wavelength channel. The second block may be configured to further add more wavelength channels. Specific configuration may be determined according to application needs. For example, when the configurable OADM mechanism 100 is deployed in a head end in a content distribution framework (described below), its configuration may be determined according to what the head end needs.

Different components in the C-OADM module 110 may be realized using various known existing technologies. For example, a wavelength selection device may be realized or implemented using a thin film filter, a fiber grating device such as a fiber Bragg grating, a Fabry-Perot, Bulk diffraction gratings, Mach-Zenhder interferometers, ring resonators, sliding wedge filters, or Arrayed Waveguide Grating Router based filter. An isolator may be used to implement the directional optical transfer device 230. A coupler may be used to implement the power splitter 240. Alternatively, different implementations may be utilized to realize components of the same type. For instance, one wavelength selection device may be realized using a thin film filter and the other two wavelength selection devices may utilize fiber Bragg grating devices.

Figure 3:
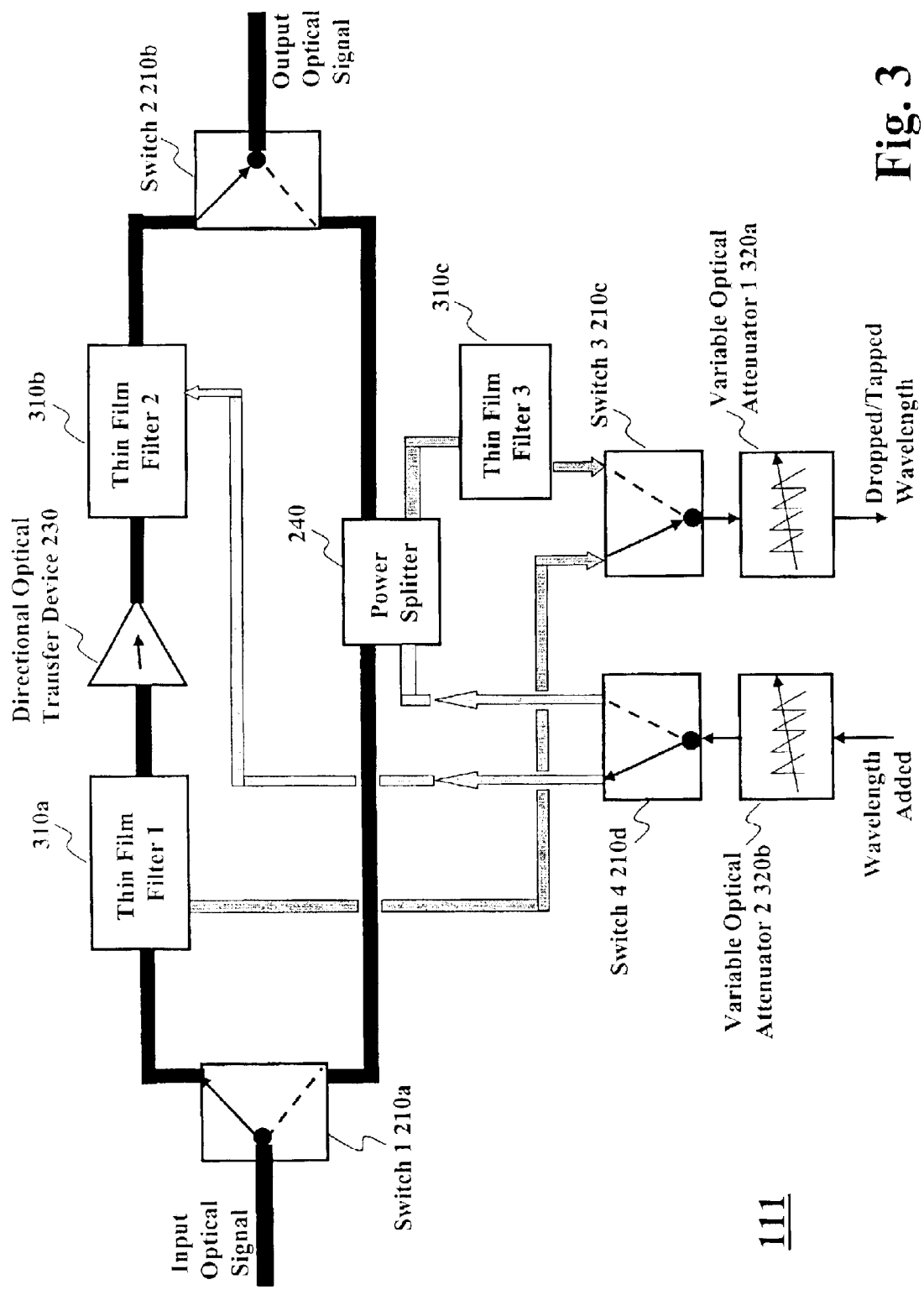
FIG. 3 depicts a first exemplary implementation of an optical add/drop multiplexer module, according to embodiments of the present invention.

FIG. 3 depicts an exemplary implementation of a C-OADM module 111, according to embodiments of the present invention. Each of the three wavelength selection devices (i.e., 220a, 220b, and 220c) are realized using a corresponding thin film filter: thin film filter 1 310a is used to realize the wavelength selection device 1 220a, thin film filter 2 310b is used to realize the wavelength selection mechanism 2 220b, and thin file filter 3 310c is used to realize the wavelength selection device 3 220c.

The optical attenuators (250a and 250b) may be implemented using variable optical attenuators (320a and 320b) to provide the flexibility of adjusting the amount of attenuation when needed.

Figure 4A:
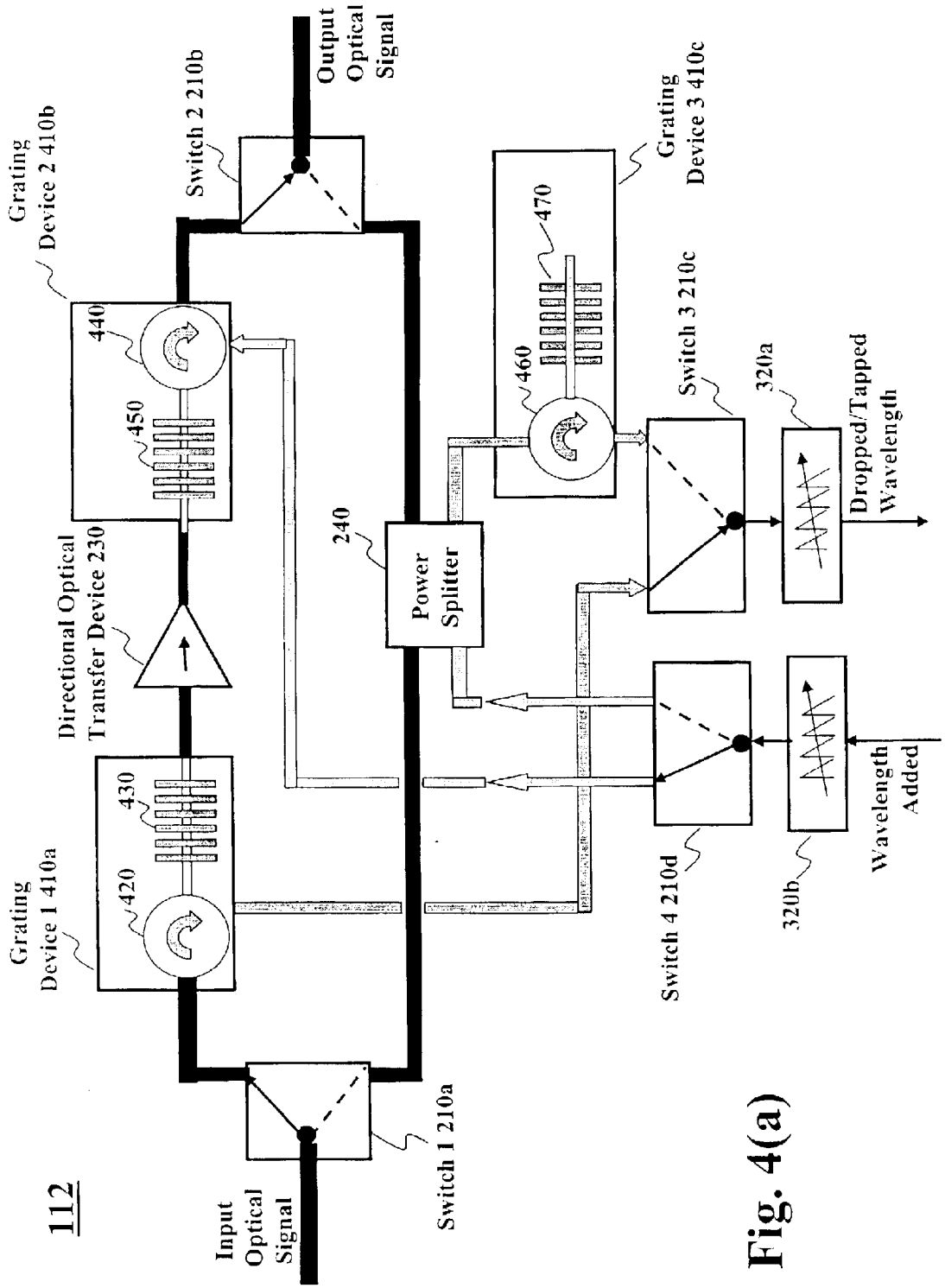
FIG. 4(a) depicts a second exemplary implementation of an optical add/drop multiplexer module, according to embodiments of the present invention.
Figure 4B:
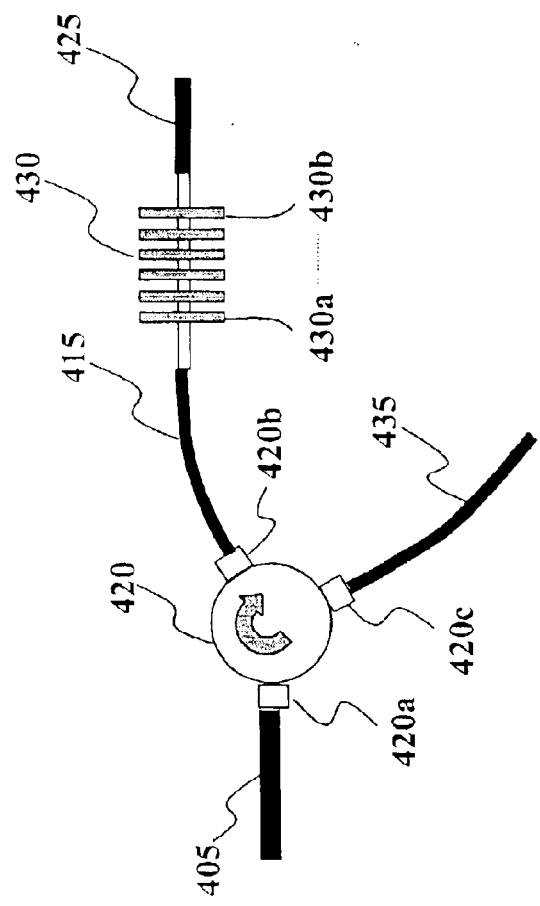
FIG. 4(b) shows in detail a mechanism of wavelength selection through a circulator and a grating.

FIG. 4(*a*) depicts a different exemplary implementation of a C-OADM module 112, according to embodiments of the present invention. The wavelength selection devices (i.e., 220a, 220b, and 220c in FIG. 2) are implemented using fiber grating devices (410a, 410b, and 410c). Each fiber grating device (e.g., the fiber Bragg grating device 1 410a) includes a circulator (e.g., 420) and a, for example, fiber Bragg grating (e.g., 430).

FIG. 4(*b*) illustrates how a circulator (e.g., the circulator 420) coupled with a grating (e.g., the fiber grating 430) achieves selection of a wavelength channel. An optical signal enters the circulator 420 from optical fiber 405 to port 420a of the circulator 420. The wavelength channels contained in the optical signal pass out of port 420b and travel via optical fiber 415 to a series of in-fiber grating elements 430a, . . . , 430b. Each of the fiber grating elements 430a, . . . , 430b may be tuned to a particular wavelength. Scan tuning may be fixed or may be adjusted through, for example, temperature or mechanical stretching. If a grating element (e.g., 430a) is tuned to a particular wavelength, this grating element reflects a band of wavelengths centered on the tuned wavelength and allows other wavelengths outside of the band to pass through.

To use the fiber Bragg grating 430 to select a wavelength channel, one of the grating elements is tuned to reflect the wavelength. The wavelength is reflected back to port 420b of the circulator 420. The circulator 420 then directs the selected wavelength channel from its third port 420c to optical fiber 435. Here, the circulator 420 serves as a directional transfer device. Therefore, it may also be implemented using a coupler possibly with an isolator (which serves as a directional transfer device).

Figure 5:
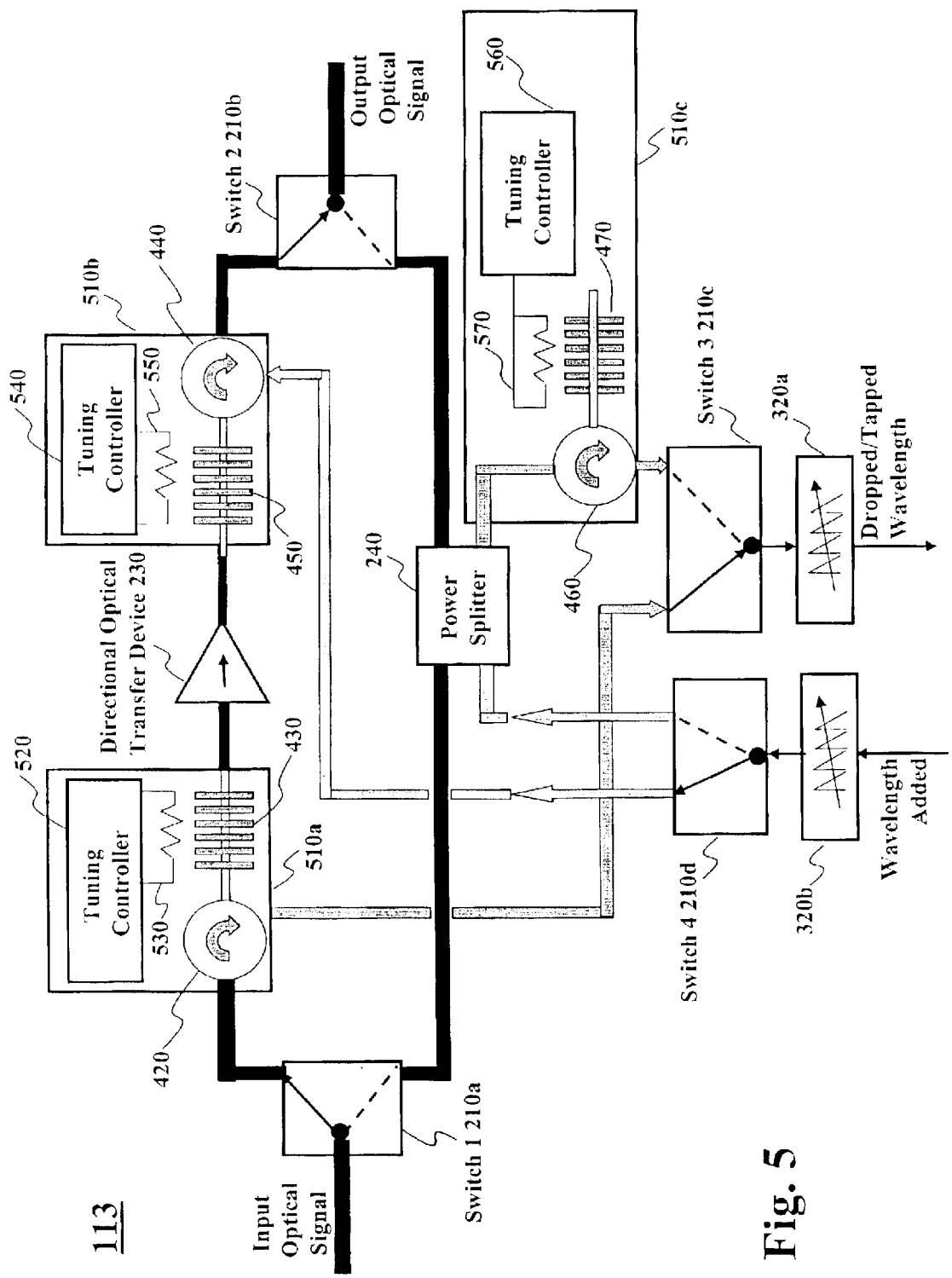
FIG. 5 depicts a third exemplary implementation of an optical add/drop multiplexer module, according to embodiments of the present invention.

Bragg gratings can be tuned through varying temperature. FIG. 5 depicts another exemplary implementation of a C-OADM module 113, according to embodiments of the present invention. Wavelength selection devices are realized using tunable fiber Bragg grating devices 510a, 510b, and 510c. Each tunable fiber Bragg grating device includes a tuning controller (520, 540, 560) and a corresponding resistive heating element (530, 550, 570). Through a tuning controller, the desired wavelength to be selected or reflected can be adjusted. For instance, by adjusting the temperature via the resistive heating element 530 through the tuning controller 520, the wavelength to be selected or reflected by the tunable fiber Bragg grating device 510a can be controlled. Similarly, the wavelength to be added through the tunable fiber Bragg grating device 510b can be controlled by adjusting the temperature via the resistive heating element 550 through the tuning controller 540.

Using tunable fiber grating devices within the C-OADM module 110, the functionality achieved by the module can be configured according to dynamic needs. While the configurable OADM mechanism 100 can be configured dynamically in terms of how many C-OADM modules are to be used to form a processing pipeline (through switches 11 120a, 12 120b, . . . , k2 120f, see FIG. 1), having the above described configurable features within each of the C-OADM modules provide additional flexibility in terms of what the configurable OADM mechanism 100 can achieve.

Figure 6:
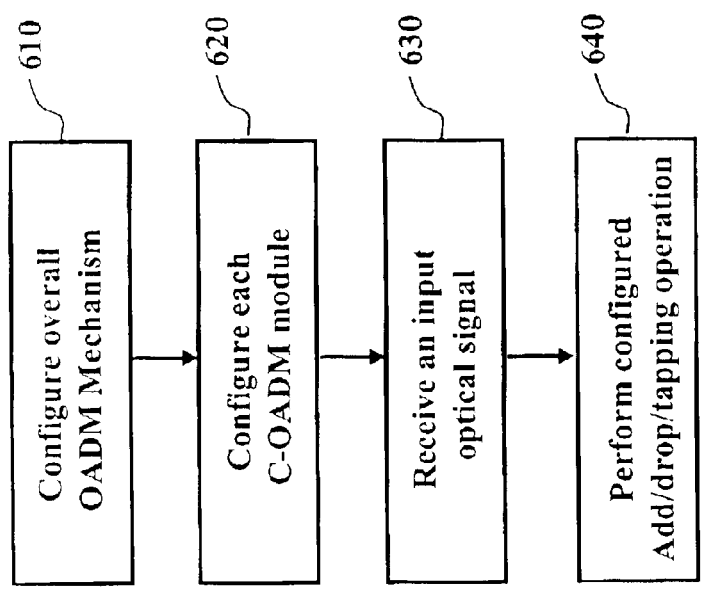
FIG. 6 is a flowchart of an exemplary process, in which a configurable optical add/drop multiplexer mechanism performs wavelength operations based on its configuration, according to embodiments of the present invention.

FIG. 6 is a flowchart of an exemplary process, in which the configurable OADM mechanism 100 performs wavelength operations based on its configuration, according to embodiments of the present invention. The overall OADM mechanism (100) is first configured at act 610. This includes configuring each pair of the switches connected to each individual C-OADM module to form a desired processing pipeline. When a pair of switches is set to their upper positions, the associated C-OADM module is deployed to perform a certain operation. When a pair of switches is set to their lower positions, the optical signal bypasses the associated C-OADM module.

Each of the C-OADM modules is then individually configured at act 620. This may include adjusting the wavelength channels to be dropped, to be added, and determining whether the optical signal is to be tapped. With a particular configuration, when an input optical signal is received at act 630, the configurable OADM mechanism 100 performs, at act 640, the designated operations according to its configuration.

Figure 7:
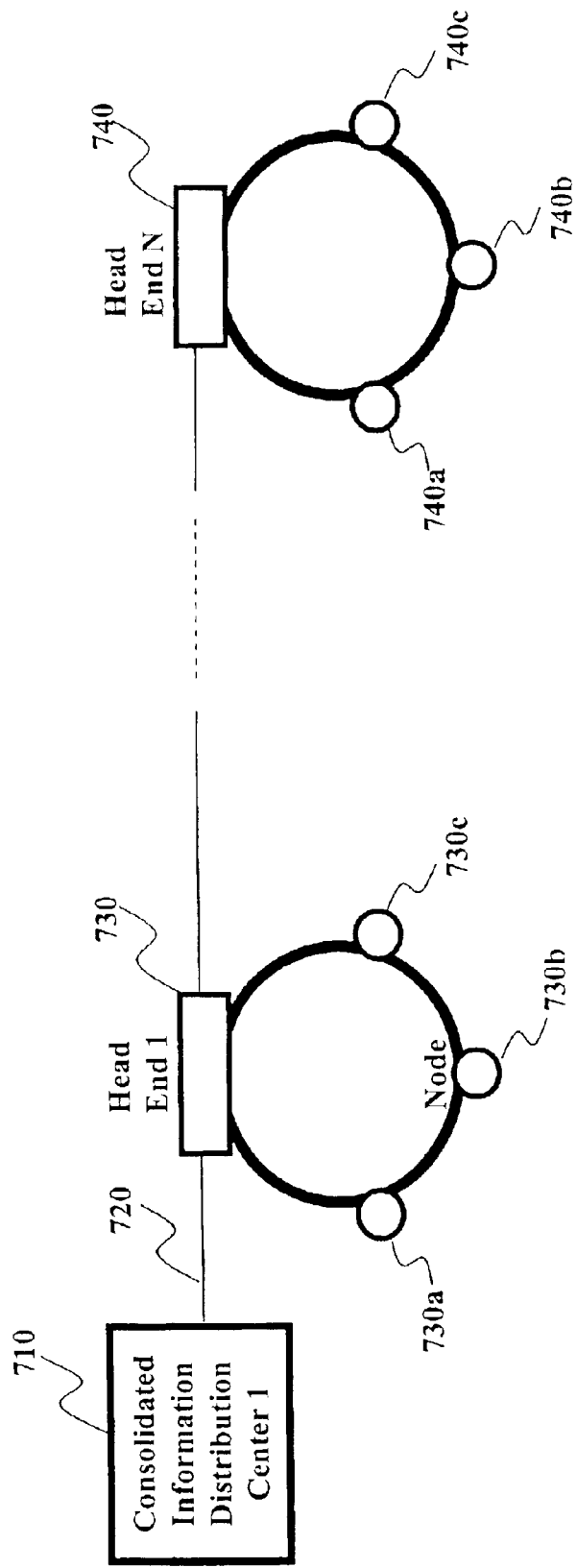
FIG. 7 depicts an exemplary consolidated information distribution framework in which each head end processes an optical signal via a configurable add/drop multiplexer mechanism, according to embodiments of the present invention.

FIG. 7 depicts an exemplary consolidated information distribution framework 700 in which each head end processes an optical signal using a configurable OADM mechanism, according to embodiments of the present invention. The consolidated information distribution framework 700 comprises a consolidated information distribution center 710 and a plurality of head ends 730, . . . , 740. The consolidated information distribution center 710 distributes optically encoded information in the form of an optical signal to the head ends 730, . . . , 740 via an optical fiber 720. In this framework, each head end (e.g., 730) may include a plurality of nodes (e.g., 730*a*, 730*b*, . . . , 730*c*) and, upon receiving the information via the optical fiber 720, each head end distributes the content to its nodes, from where the content is sent to subscribers.

The consolidated information distribution center 710 may distribute information in different fashions. For example, it may broadcast information to all of its head ends. In this case, information is encoded in those wavelength channels that are to be accessed by all head ends. The consolidated information distribution center 710 may also use disjoint dedicated wavelength(s) for each head end. In this case, each head end may be tuned to its dedicated wavelength(s) and may select only those dedicated wavelength channels from the passing optical signal.

The consolidated information distribution center 710 may also distribute information using both broadcast and dedicated channels. For example, certain information (e.g., broadcast news) may be distributed in a broadcast fashion using some wavelength(s) that are used for broadcasting purposes. In this case, each head end is tuned to such broadcast wavelength(s), taps the wavelength(s), and then passes on the wavelength(s) to the next head end. On the other hand, other types of information (e.g., video on demand) may be distributed using dedicated channels. This requires each head end be simultaneously tuned to the wavelength(s) that are dedicated to it., Therefore, each head end is tuned to both the broadcast channel(s) and its associated dedicated channel(s).

Figure 8:
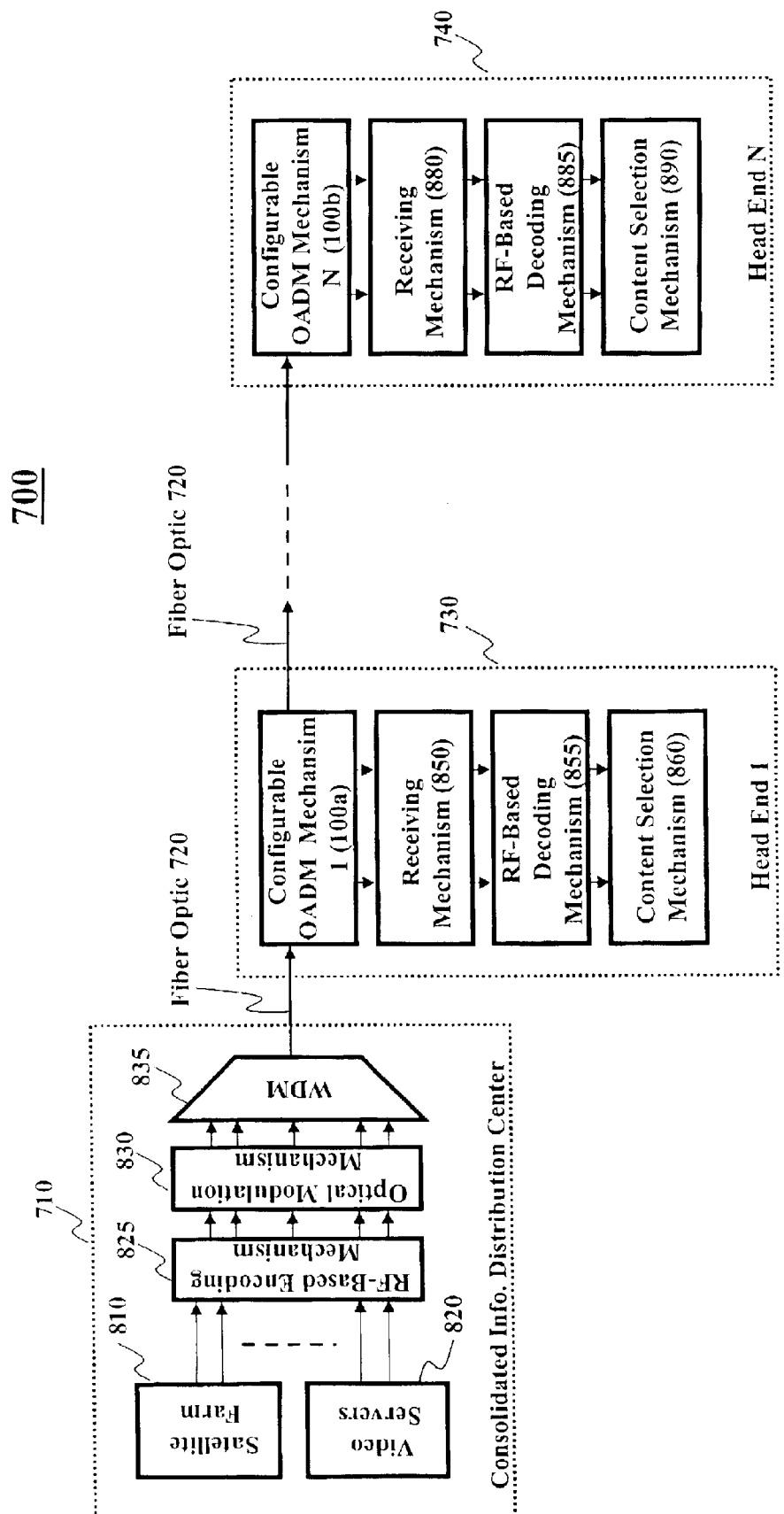
FIG. 8 shows the internal structure of a head end with a configurable OADM in relation to a consolidated information distribution center, according to embodiments of the present invention.

FIG. 8 shows an example of the internal structure of head ends in relation to the consolidated information distribution center 710 where each head end utilizes a configurable OADM mechanism, according to embodiments of the present invention. At the consolidated information distribution center 710, information may be acquired through a satellite farm 810 or may be from one or more video servers 820. Such information is first converted to RF signals by an RF-based encoding mechanism 825. The RF signals are then up-converted, by an optical modulation mechanism 830, onto various optical carriers to produce different optical signals. A wavelength division multiplexer 835 finally multiplexes the optical signals carried on various wavelength channels to generate a single optical signal, which is then sent to the head ends via the fiber optic 720.

The optical signal travels through the fiber optic 720 and reaches all the head ends. At each head end, a configurable OADM mechanism is deployed to perform necessary processing. The head end 730 deploys a configurable OADM mechanism 100*a*, . . . , the head end 740 deploys a configurable OADM mechanism 100*b*. The configurable OADM mechanism at each head end is configured so that desired information encoded in the optical signal can be accessed. For example, if the consolidated information distribution center 710 dedicates wavelength channels $\lambda_1$ to head end 730 and wavelength $\lambda_2$ to head end 740 (assuming neither head end shares any wavelength), the configurable OADM mechanism 100*a* may be configured to drop wavelength $\lambda_1$ when the optical signal passes through and forward other wavelength(s) to other head ends. At head end 740, the configurable OADM mechanism 110*b* is configured to drop wavelength $\lambda_2$ from the passing optical signal.

When the consolidated information distribution center 710 sends information to the head ends via a shared wavelength (e.g., as a broadcast channel), all the configurable OADM mechanisms associated with the head ends are configured to tap the optical signal to obtain the broadcast information. When each head end simultaneously has some dedicated wavelength(s), its configurable OADM mechanism is also set up so that such dedicated wavelength(s) can be dropped from the tapped optical signal.

At each head end, a dropped wavelength (either after tapping or without tapping) is down-converted to RF signals. This is achieved by a receiving mechanism within each head end (850, . . . , 880). The RF signals are further decoded through a corresponding RF-based decoding mechanism (855, . . . , 885) to produce modulated signals. A content selection mechanism in each head end (860, . . . , 890) then selects appropriate content and distributes to its nodes.

Figure 9:
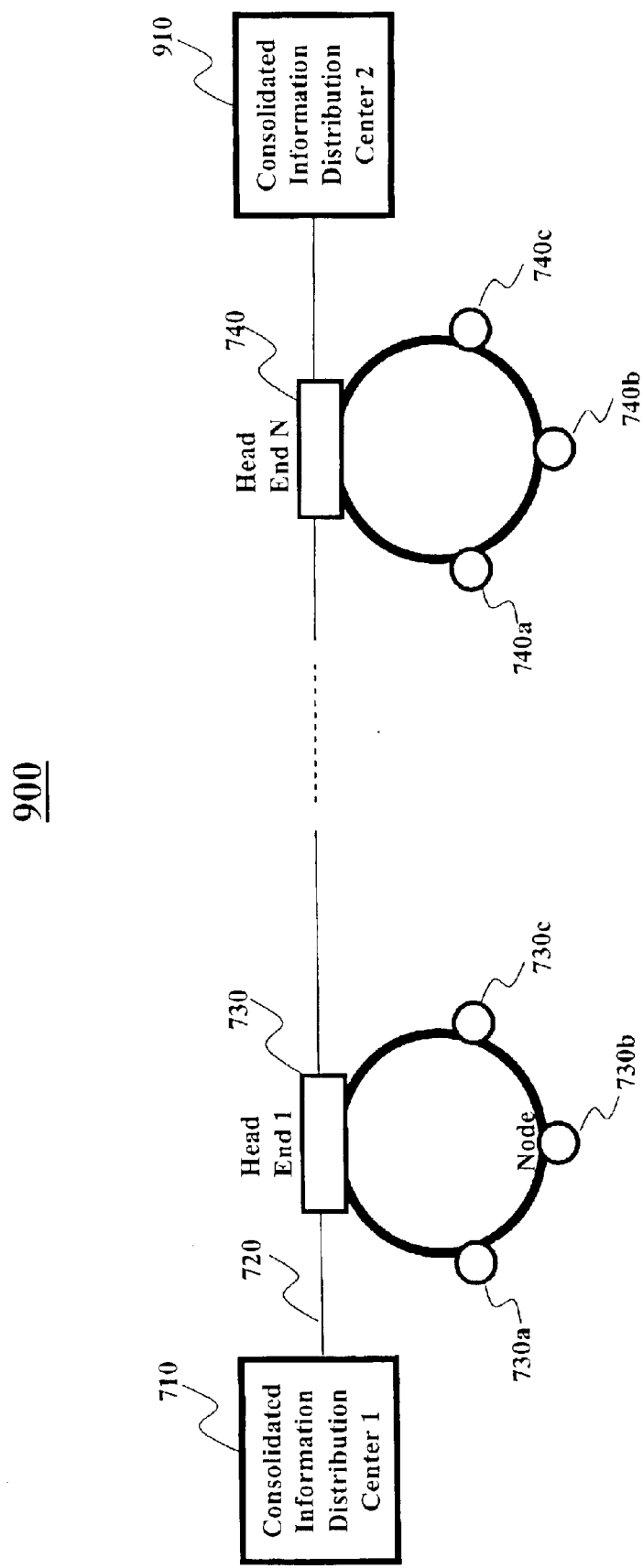
FIG. 9 depicts an alternative consolidated information distribution framework in which each head end processes an optical signal via a configurable add/drop multiplexer mechanism, according to embodiments of the present invention.

FIG. 9 depicts an alternative fault tolerant consolidated information distribution framework 900 in which each head end processes an optical signal from one of two consolidated information distribution centers via a configurable OADM mechanism, according to embodiments of the present invention. In the framework 900, an additional consolidated information distribution center 2 910 is provided which sends an optical signal encoded with the same information as what is encoded in the optical signal from the consolidated information distribution center 1 710. Both distribution centers 710 and 910 send their optical signals via the optical fiber 720 to the head ends but in opposite directions.

The head ends are capable of receiving an optical signal from either one of the centers. A default distribution center may be defined (e.g., the consolidated information distribution center 1 may be defined as the default distribution center). The bead ends may be set up so that in normal situations they receive an optical signal from the default distribution center. When the default center is in error or becomes non-operational, the head ends may alternatively switch to receive the optical signal sent from the consolidated information distribution center 2 910.

Figure 10:
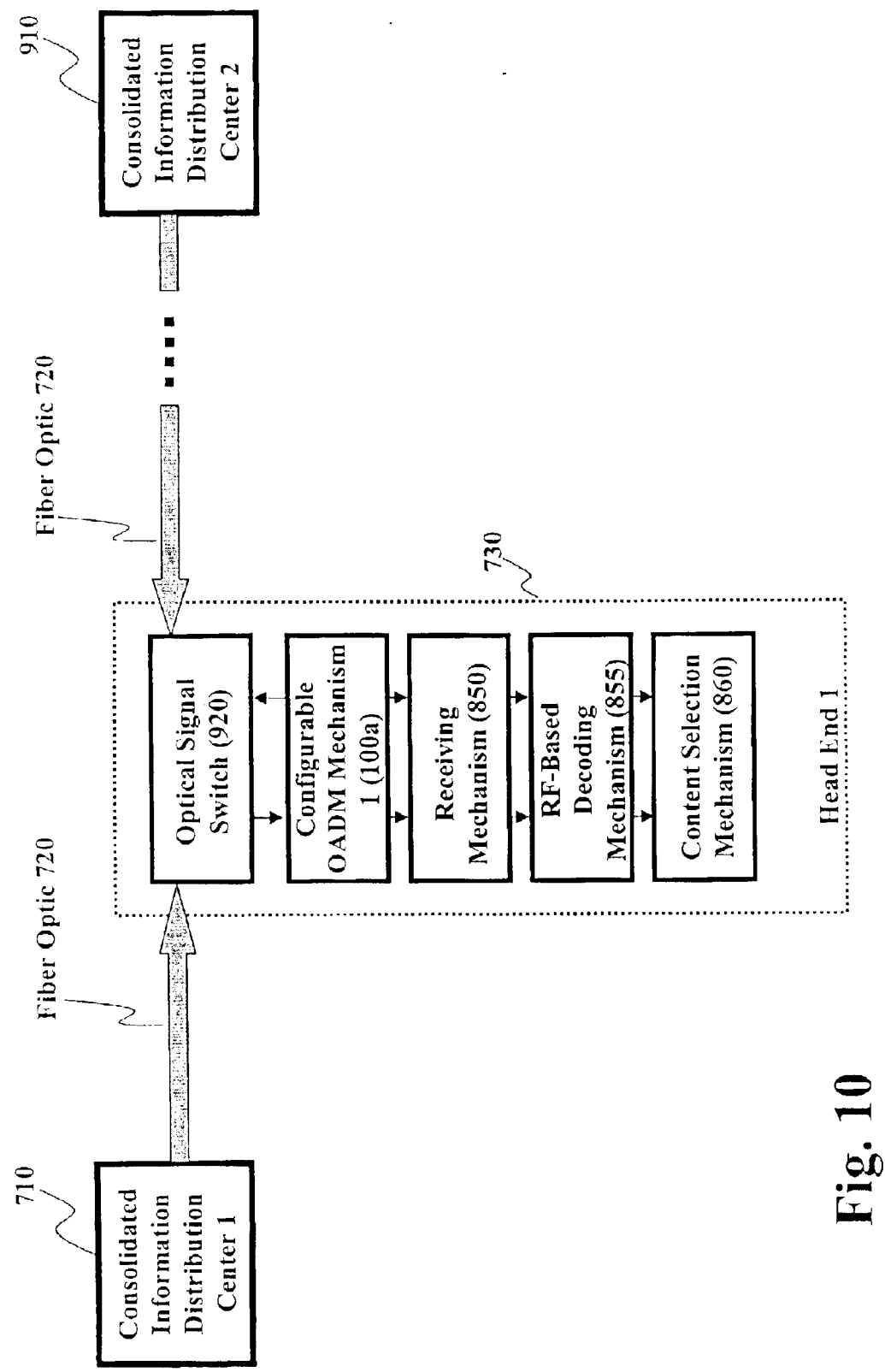
FIG. 10 shows the internal structure of a head end in relation to two consolidated information distribution centers, according to embodiments of the present invention.

FIG. 10 shows the internal structure of a head end (e.g., the head end 730) in the alternative consolidated information distribution framework 900, according to embodiments of the present invention. An optical signal switch 920 is positioned in front of the configurable OADM mechanism 1 100*a*. The optical signal switch 920 passes an optical signal from one of the two consolidated information distribution centers (710 and 910) to the configurable OADM mechanism 1 100*a* and further forwards the output of the configurable OADM mechanism 1 100*a* to the next head end.

Other alternative information distribution frameworks may also be employed (not shown). For example, the consolidated information distribution center and the head ends may be arranged in a star or a ring configuration. Fault tolerant solutions discussed above may also be incorporated into these alternative system configurations.

Figure 11:
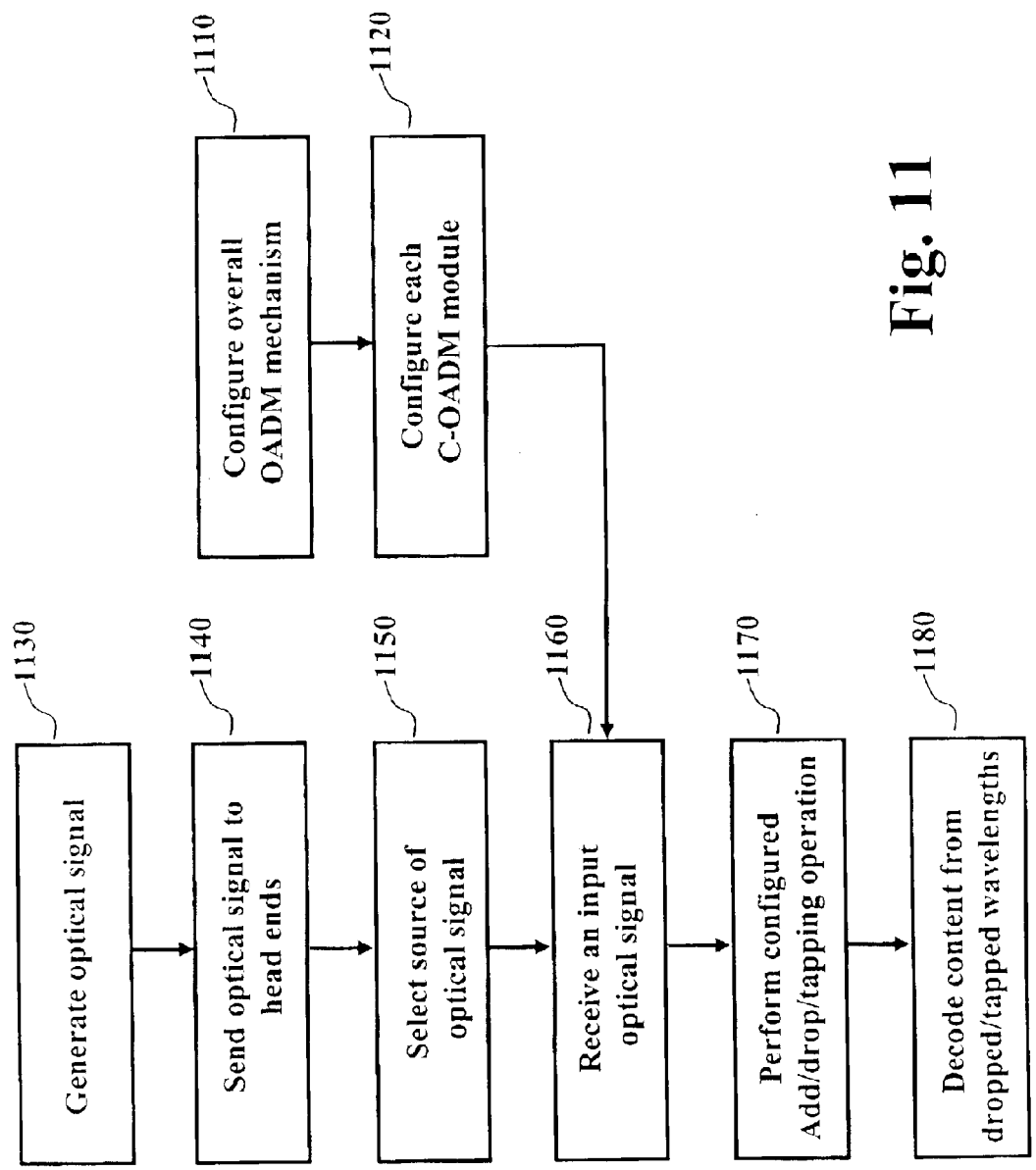
FIG. 11 is a flowchart of an exemplary process, in which head ends in a consolidated information distribution framework utilize configurable add/drop multiplexer mechanisms for processing an optical signal, according to embodiments of the present invention.

FIG. 11 is a flowchart of an exemplary process, in which head ends in a consolidated information distribution framework utilize configurable OADM mechanisms to processing an optical signal, according to embodiments of the present invention. The configurable OADM mechanisms associated with all the head ends are first configured according to, for example, the allocation of wavelength channels within the distribution framework. This involves configuring, at act 1110, each configurable OADM mechanism. The configuration at this level may be determined according to factors such as how many wavelength channels are dedicated to each head or whether there is any wavelength for broadcast purposes. Configuration performed at act 1110 sets up the number of C-OADM modules to be used within each configurable OADM mechanism.

The C-OADM modules within each configurable OADM mechanism are then individually configured at act 1120. After the head ends are properly configured and become operational, the consolidated information distribution center (e.g., 710) generates, at act 1130, an optical signal that encodes information to be distributed to all the head ends. The distribution center 710 then sends, at act 1140, the optical signal to the head ends along the optical fiber 720.

When there is a second consolidated information distribution center (e.g., 910) present, each head end first selects, at act 1150, the source from which an optical signal is to be received. When the optical signal from the selected source is received, at act 1160, the configurable OADM mechanism within each head end performs, at act 1170, designated add/drop multiplexer operations on the optical signal. At each head end, the desired information is then decoded, at act 1180, from the wavelength(s) dropped or tapped by its configurable OADM mechanism.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. A configurable optical add/drop multiplexer (C-OADM), comprising:
    at least one optical switch configured to select one or more optional operational modes, wherein the at least one optical switch has an input and a first and a second selectable output;
    a wavelength drop pathway in communication with the first selectable output of a first optical switch of the at least one optical switch;
    a wavelength tapping pathway in communication with the second selectable output of the first optical switch;
    a full channel add pathway in communication with the first selectable output of a second optical switch of the at least one optical switch; and
    a partial channel add pathway in communication with the second selectable output of the second optical switch, wherein
    the full channel add pathway provides a full channel added to the wavelength tapping pathway onto an unused wavelength channel, and the partial channel add pathway provides a channel added to a tapped path onto an unused channel.

2. The C-OADM according to claim 1, wherein the operational modes include:
    a drop mode;
    a tapping mode;
    an add mode;
    an add/drop mode; and
    an add/tapping mode.

3. The C-OADM according to claim 2, wherein
    the wavelength drop pathway operates when the at least one optical switch is configured to select one of the drop mode and the add/drop mode;
    the wavelength tapping pathway operates when the at least one optical switch is configured to select one of the tapping mode, the add/tapping mode, the drop/tapping mode, and the add/drop multiplexer mode;
    a first wavelength add pathway operates when the at least one optical switch is configured to select one of the add mode and the add/drop mode; and
    a second wavelength add pathway operates when the at least one optical switch is configured to select one of the add/tapping mode and the add/drop multiplexer mode.

4. The C-OADM according to claim 3, wherein the wavelength tapping pathway comprises:
    a power splitter capable of splitting the power of the wavelength channels contained in the input optical signal, received via the second selectable output of the first optical switch, to produce two portions for each wavelength channel, each of the portions corresponding to a certain amount of power of the wavelength channel.

5. The C-OADM according to claim 4, wherein the power splitter is a coupler.

6. The C-OADM according to claim 4, further comprising:
    a second wavelength selection device capable of separating the portion of a wavelength channel to be dropped from corresponding portions of at least one remaining wavelength channel contained in the input optical signal.

7. The C-OADM according to claim 6, wherein the second wavelength selection device comprises one of:
    a thin film filter; and
    a fiber Bragg grating filter.

8. The C-OADM according to claim 7, wherein the fiber Bragg grating filter has a tunable controller through which a wavelength that the grating reflects can be adjusted.

9. The C-OADM according to claim 6, further comprising:
    an optical attenuator capable of receiving the portion of the wavelength channel to be dropped, via the second selectable output of a fourth optical switch, and attenuating the portion of the wavelength channel before dropping the portion of the wavelength channel.

10. The C-OADM according to claim 9, wherein the optical attenuator is a variable optical attenuator.

11. The C-OADM as recited in claim 3, wherein the partial channel add pathway comprises:
    a power splitter capable of splitting the power of both the wavelength channels in the input optical signal and a channel to be added, yielding two portions for each wavelength where each of the portions corresponding to a certain amount of power and producing an updated optical signal having the channel to be added incorporated in one of the wavelength channels in the output optical signal with partial power, wherein,
    the input signal is received at the power splitter through the second selectable output of the first optical switch,
    the wavelength channel to be added is received at the power splitter via the second selectable output of the second optical switch.

12. The C-OADM according to claim 11, wherein the power splitter is a coupler.

13. The C-OADM according to claim 1, wherein the full channel add pathway comprises:
    a third wavelength selection device capable of producing a combined optical signal by incorporating an added wavelength channel with at least one wavelength channel in the input optical signal, received via the first selectable output of the first optical switch, the wavelength channel to be added being received via the first selectable output of the second optical switch; and a third optical switch capable of being configured to allow the combined optical signal to travel through.

14. The C-OADM according to claim 13, wherein the third wavelength selection device comprises one of:

a thin film filter; and a fiber Bragg grating filter.

15. The C-OADM according to claim 14, wherein the fiber Bragg grating filter has a tunable controller through which a wavelength that the Bragg grating reflects can be adjusted.

16. The C-OADM according to claim 13, further comprising:

a directional optical transfer device capable of unidirectionally directing the wavelength channel to be added in a direction in which the input optical signal travels.

17. A consolidated information distribution system, comprising:

a consolidated information distribution center capable of sending an optical signal and aggregating signals carried on a plurality of optical channels via at least one optical fiber that transports the optical signal; and at least one head end, each of which being capable of receiving the optical signal and obtaining content from the optical signal via a configurable optical add/drop multiplexer (OADM) as recited in claim 1.

18. The system according to claim 17, wherein the configurable OADM is capable of at least one of adding a wavelength channel to the optical signal, dropping a wavelength channel from the optical signal, tapping the wavelength channels contained in the optical signal, and a combination thereof.

19. The system according to claim 17, wherein the at least one head end and the consolidated information distribution center is arranged in at least one of:

a linear configuration in which the at least one head end is arranged in a serial fashion and the optical signal is transported from the consolidated information distribution center to the at least one head end in a direction from a first head end to a last head end;

a star configuration in which the optical signal from the consolidated information distribution center is transported via the at least one optical fiber directly to every head end of the at least one head end; and a ring configuration in which the at least one head end is arranged in a circular fashion, wherein the optical signal from the consolidated information distribution center is transported to the at least one head end in both a first direction from a first head end to a last head end and a second direction from the last head end to the first head end.

20. The system according to claim 19, wherein the linear configuration further comprising a second consolidated information distribution center connecting to the at least one head end arranged in the serial fashion via the at least one optical fiber, wherein the optical signal is transported from the second consolidated information distribution center to the at least one head end in a direction from the last head end to the first head end; and the star configuration further comprising a second consolidated information distribution center connecting to the at least one head end in the star configuration via at least one optical fiber, wherein the optical signal from the second consolidated information distribution center is transported directly to every head end of the at least one head end.

21. A method for performing an operation on an optical signal with a configurable optical add/drop multiplexer (OADM) as recited in claim 1, comprising:

configuring the configurable OADM to produce a desired configuration;

receiving, by the configurable OADM, an optical signal with at least one wavelength channel; and performing, by at least one configurable optical add/drop multiplexer (C-OADM) module within the configurable OADM mechanism, wavelength processing on the at least one wavelength channel according to the desired configuration.

22. The method according to claim 21, wherein said configuring comprises:

configuring a plurality of optical switches associated with the at least one C-OADM module; and configuring at least some of the at least one C-OADM module, the at least some of the C-OADM module being selected by the plurality of configured optical switches.

23. The method according to claim 21, wherein the wavelength processing includes at least one of:

dropping a wavelength channel from the optical signal;

adding a wavelength channel to the optical signal;

tapping a wavelength channel of the optical signal;

dropping a first wavelength channel from and adding a second wavelength channel to the optical signal at the same time;

dropping a first wavelength channel from and adding the same wavelength channel to the optical signal at the same time;

dropping a wavelength channel after the wavelength channel in the optical signal is tapped;

adding a tapped wavelength channel to the optical signal after the optical signal is tapped; and dropping a first tapped wavelength channel from and adding a second tapped wavelength channel to the optical signal after the optical signal is tapped.

24. A method of transmitting information with an optical communication system having a consolidated information distribution framework, comprising:

configuring at least one configurable optical add/drop multiplexer (OADM) as recited in claim 1, associated with corresponding at least one head end;

generating, by a consolidated information distribution center, an optical signal encoded with information to be distributed to the at least one head end;

sending the optical signal to the at least one head end;

receiving an optical signal at each head end; and performing, by the configurable OADM associated with each head end, wavelength processing on the received optical signal according to the configuration of the configurable OADM to produce an updated optical signal.

25. The method according to claim 24, wherein said configuring comprises:

configuring a plurality of optical switches associated with at least one C-OADM module within the configurable OADM mechanism; and configuring at least some of the at least one C-OADM module, the at least some of the C-OADM module being selected by the plurality of configured optical switches.

26. The method according to claim 24, wherein the wavelength processing includes at least one of:

dropping a wavelength channel from the optical signal;

adding a wavelength channel to the optical signal;

tapping a wavelength channel of the optical signal;

dropping a first wavelength channel from and adding a second wavelength channel to the optical signal at the same time;

dropping a first wavelength channel from and adding the same wavelength channel to the optical signal at the same time;

dropping a wavelength channel after the wavelength channel in the optical signal is tapped;

adding a tapped wavelength channel to the optical signal after the optical signal is tapped; and dropping a first tapped wavelength channel from and adding a second tapped wavelength channel to the optical signal after the optical signal is tapped.

27. The method according to claim 24, further comprising:

forwarding, by the head end, the updated optical signal to a next head end.

28. A configurable optical add/drop multiplexer (C-OADM), comprising:

at least one optical switch configured to select one or more optional operational modes, wherein the at least one optical switch has an input and a first and a second selectable outputs;

a wavelength drop pathway in communication with the first selectable output of a first optical switch of the at least one optical switch; and a wavelength tapping pathway in communication with the second selectable output of the first optical switch;

wherein the optional modes include:

a drop mode, a tapping mode, an add mode, an add/drop mode, and an add/tapping mode;

wherein the wavelength drop pathway operates when the at least one optical switch is configured to select one of the drop mode and the add/drop mode;

the wavelength tapping pathway operates when the at least one optical switch is configured to select one of the tapping mode, the add/tapping mode, the drop/tapping mode, and the add/drop multiplexer mode;

the first wavelength add pathway operates when the at least one optical switch is configured to select one of the add mode and the add/drop mode; and the second wavelength add pathway operates when the at least one optical switch is configured to select one of the add/tapping mode and the add/drop multiplexer mode wherein the wavelength drop pathway comprises:

a first wavelength selection device capable of separating a wavelength channel to be dropped from an input optical signal, received via the first selectable output of the first optical switch, and producing an updated optical signal with at least one remaining wavelength channel after a wavelength channel to be dropped is separated;

a third optical switch capable of being configured to allow the updated optical signal with the at least one remaining wavelength channel to travel through.

29. The C-OADM according to claim 28, wherein the first wavelength selection device comprises one of:

a thin film filter; and a fiber Bragg grating filter.

30. The C-OADM according to claim 29, wherein the fiber Bragg grating filter has a tunable controller through which a wavelength that the grating reflects can be adjusted.

31. The C-OADM according to claim 28, further comprising:

an optical attenuator capable of receiving the wavelength channel to be dropped, via the first selectable output of a fourth optical switch, and attenuating the wavelength channel before dropping the wavelength channel.

32. The C-OADM according to claim 31, wherein the optical attenuator is a variable optical attenuator.

* * * * *